March 18, 1924.                                           1,487,474
H. J. RHODES
CASING FOR SMALL COOKING STOVES
Filed Sept. 20, 1921
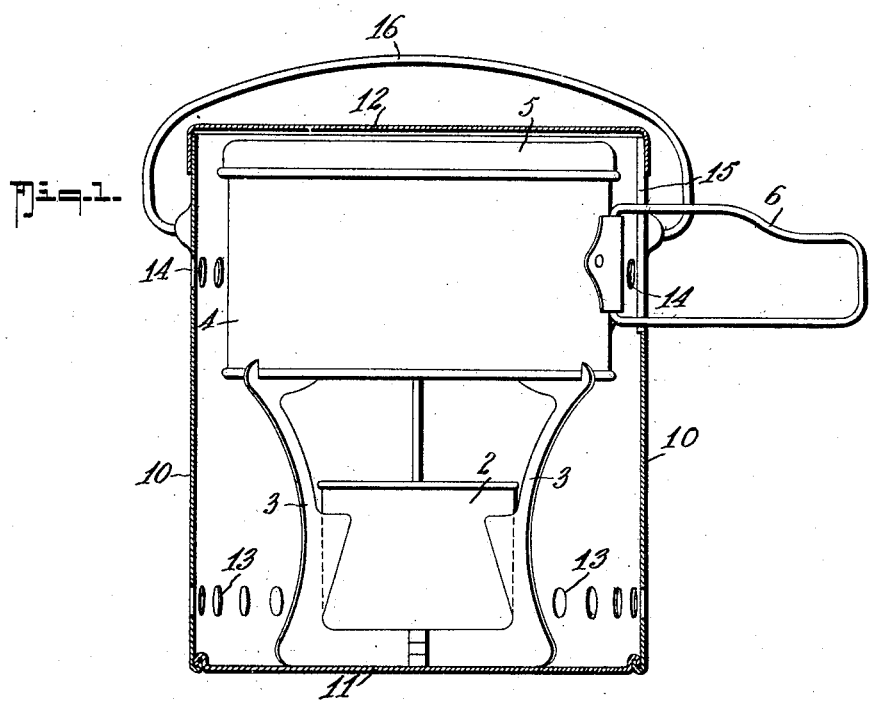
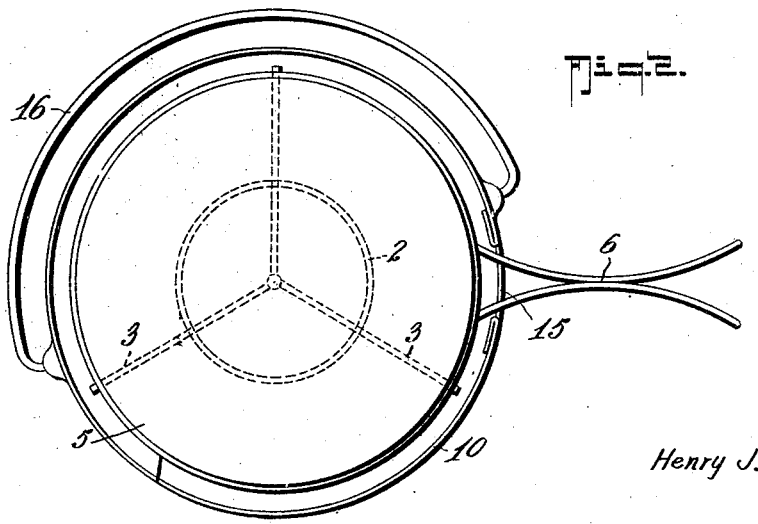
Inventor
Henry J. Rhodes
By Fred G. Dieterich
Attorneys Patented Mar. 18, 1924.

1,487,474

UNITED STATES PATENT OFFICE.

HENRY JAMES RHODES, OF VANCOUVER, BRITISH COLUMBIA, CANADA.

CASING FOR SMALL COOKING STOVES.

Application filed September 20, 1921. Serial No. 502,049.

*To all whom it may concern:*

Be it known that I, HENRY J. RHODES, subject of the King of Great Britain, residing at Vancouver, in the Province of British Columbia, Canada, have invented certain new and useful Improvements in Casings for Small Cooking Stoves, of which the following is a specification.

This invention relates to a shield or casing to protect from draught the flame of a heating means of that class known as "canned heat," wherein a solidified alcohol is used for cooking purposes, and will retain the heat in contact with the vessel to be heated.

In such appliances, the receptacle in which is the fuel solidified alcohol, is supported within a tripod frame, which frame supports the cooking vessel over the flame.

With such, the heat is free to escape from contact with the cooking vessel, and particularly so when it is exposed to a light breeze or draught which is sufficient to blow the flame and heated air aside and delays or prevents the effective heating of the contents of the vessel. It is to prevent this that the device which forms the subject matter of this application has been devised. It comprises an outer casing that will enclose the lamp stand and cooking vessel and thus prevent draught from carrying the flame and heat aside from the bottom of the vessel, and retains it in contact therewith.

This casing also provides a receptacle within which the entire outfit of fuel holder, stand, cooking vessel, etc., may conveniently be carried.

The device is fully described in the following specification, reference being made to the drawings by which it is accompanied, in which:

Fig. 1 is a section of the casing with the fuel stand and cooking vessel shown in elevation, and Fig. 2 is a plan of the casing with the cover of the same removed.

In these drawings 2 represents the fuel holder, 3 the stand and 4 the cooking vessel, 5 its cover and 6 its folding handle. 10 represents the casing of thin sheet metal which is the particular subject of this application. This casing preferably has a bottom 11 and cover 12. The casing may be of any suitable form and its dimensions such as will enclose within it and its cover 12 the stand 3 and cooking vessel 5. Around the lower part of the casing 10 are apertures 13 admitting to within it a sufficiency of air for combustion, and adjacent the upper part, a similar series of apertures 14 provide escape for the products of combustion.

The casing 10 has also a vertically elongated aperture 15 extending from the upper edge downward a sufficient distance to permit the folding handle 6 of the cooking vessel to project through the casing where the handle is such as may require such provision. It may also have a bale handle 16 by which it may be carried or moved from place to place when in use.

With this provision the flame of the fuel is not only sheltered from draught, but the heat from it is largely retained in contact with the vessel 4, thereby hastening to a very marked extent the heating of its contents.

It forms also a container within which the various parts of the equipment may conveniently be packed.

The device may, with this sheltering casing, be used for camping or travelling and particularly for use in automobiles, as when closed within the casing there is little risk of fire as the flame cannot be blown about and further the cooking can proceed while the car is in full movement.

Having now particularly described my invention, I hereby declare that what I claim as new and desire to be protected in by Letters Patent, is:

A protective shield for a heating device, comprising the combination with the fuel holder and its stand, and a cooking vessel on the stand having hinged handles adapted to be folded against the vessel or projected at right angles thereto, said casing having provisions adjacent the lower part for admitting air for combustion and adjacent the upper part providing escape for the products of combustion and also having a vertical slot extending to the top of the casing into which the handle of the cooking vessel may be passed and through which it may be projected when said handle is extended at right angles to the cooking vessel, and a cover removably fitting the casing, the internal diameter of the casing being sufficiently greater than the external diameter of the vessel to allow the handles of the cooking vessel to be folded against the cooking vessel and the cooking vessel inserted into the casing if desired.

In testimony whereof I affix my signature.

HENRY JAMES RHODES.